United States Patent [19]

Gawne

[11] 4,218,176
[45] Aug. 19, 1980

[54] FLUID PROPULSION APPARATUS

[76] Inventor: Gordon S. Gawne, 840 Roeser St., Freeland, Mich. 48623

[21] Appl. No.: 906,486

[22] Filed: May 17, 1978

[51] Int. Cl.² ............................................. F01D 1/36
[52] U.S. Cl. .................................. 415/90; 415/201; 415/202
[58] Field of Search ..................... 415/89, 90, 92, 202, 415/201

[56] References Cited

U.S. PATENT DOCUMENTS

| 1,346,292 | 7/1920 | Becklund | 415/90 |
| 1,402,053 | 1/1922 | Dake | 415/90 |
| 1,429,570 | 9/1922 | Dake | 415/90 |
| 4,025,225 | 5/1977 | Durant | 415/90 |

Primary Examiner—Louis J. Casaregola
Attorney, Agent, or Firm—Cullen, Sloman, Cantor, Grauer, Scott & Rutherford

[57] ABSTRACT

An improved fluid propulsion apparatus of the type including a housing and a plurality of spaced apart discs rotatably mounted on a shaft and positioned within the housing. The housing includes a circumferential peripheral zone, defined as the region between the interior of the housing and the periphery of the discs, and further includes inlet and outlet ports each in communication with the interior of the housing. The apparatus may be utilized as a liquid pump, liquid ring pump, vacuum pump, air compressor or blower, mixer or blender, and as a turbine. During operation as a pump, the shaft and discs are rotated within the housing and fluid enters the port at a center port of the housing, flows in an outwardly spiraling path between the discs within the housing, and continues to flow into the peripheral zone from which it is removed through a port or ports at the periphery of the housing, such as through a pitot-like fluid flow path.

When the apparatus is used as a turbine, fluid, air or steam is injected into the peripheral zone through pitot-like flow paths, flows in an inwardly spiraling path, thus causing rotation of the discs and shaft, and the fluid then exits the housing from the central port.

The pitot-like flow paths have a cross-sectional area which does not exeed about 60 percent of the corresponding cross-sectional area of the peripheral zone. In one embodiment the pitot-like flow paths are bored in a pitot block which in turn is removably secured to the housing. The removable pitot block offers the versatility of changeable head (pressure) and flow characteristics.

10 Claims, 11 Drawing Figures

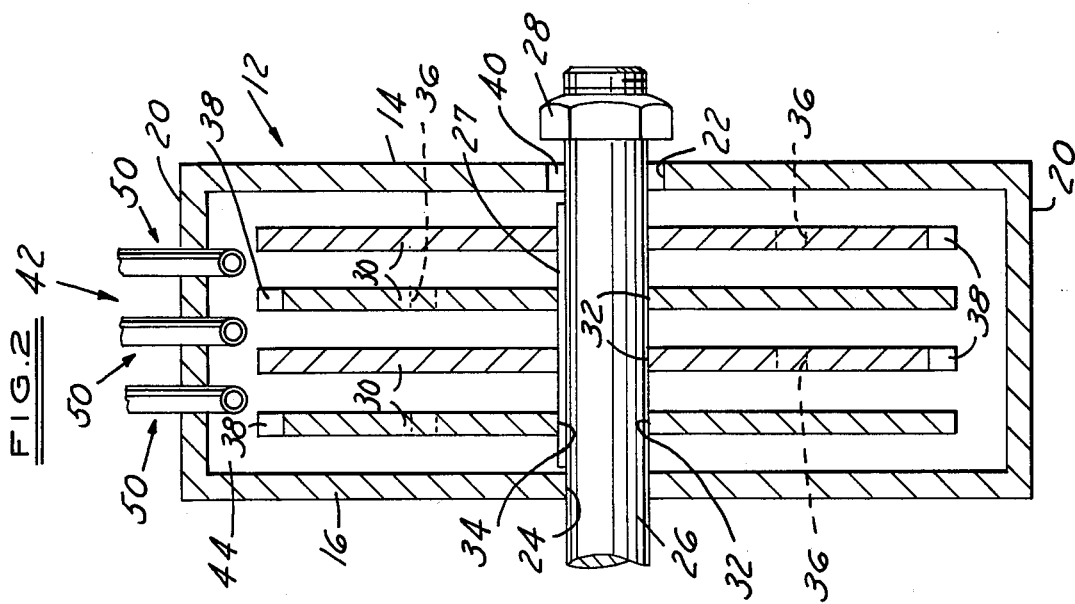
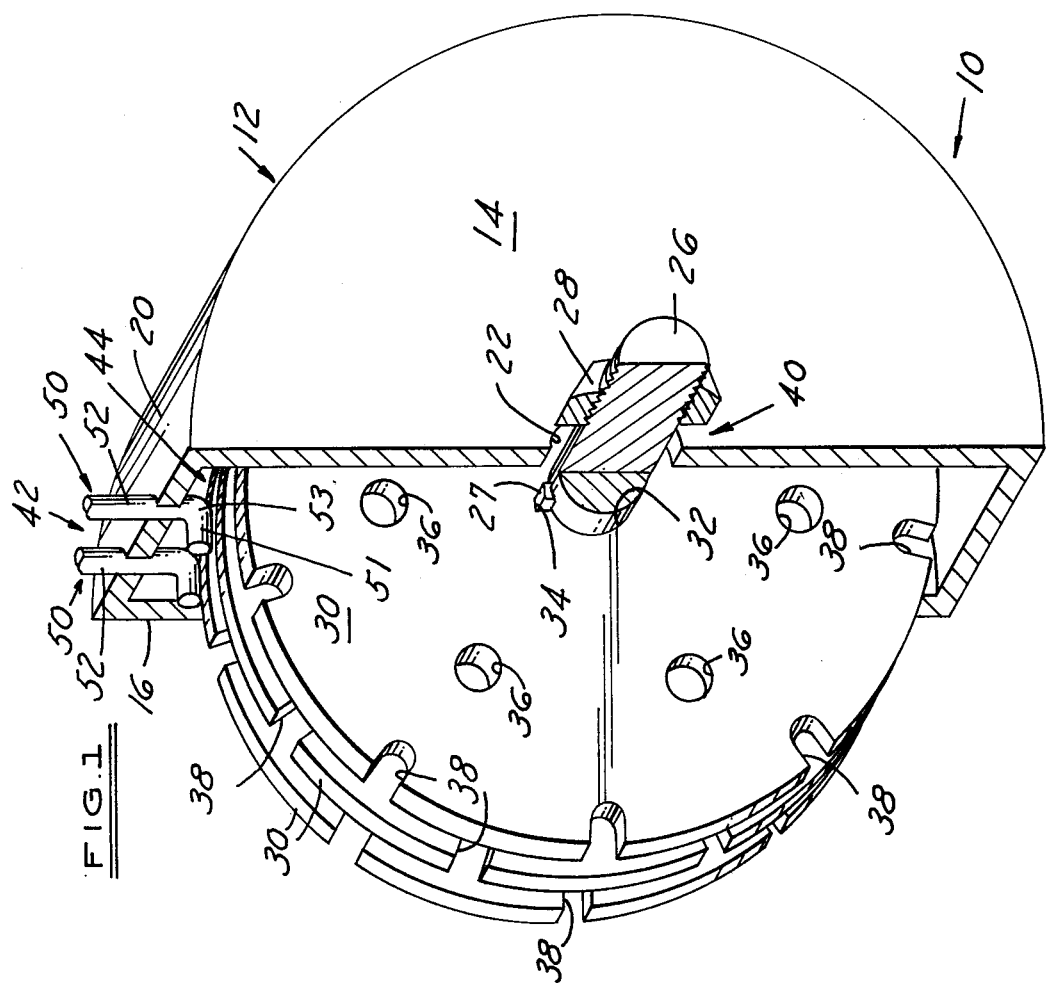

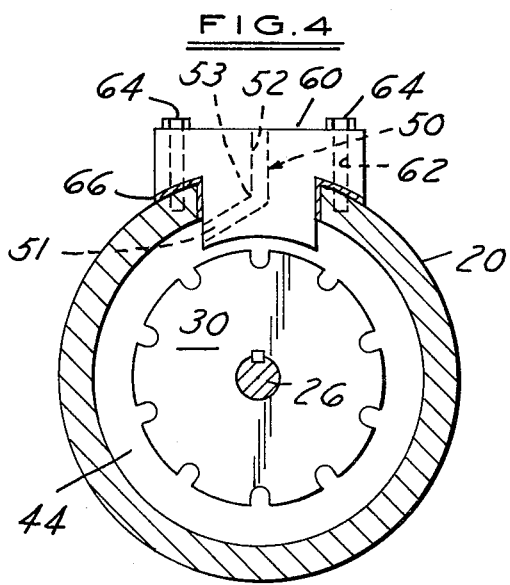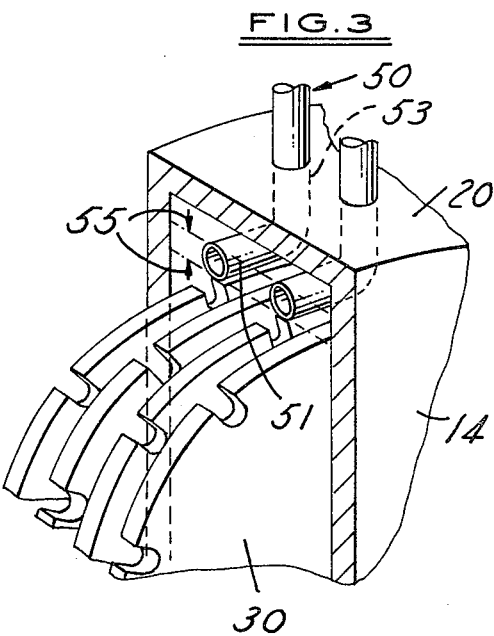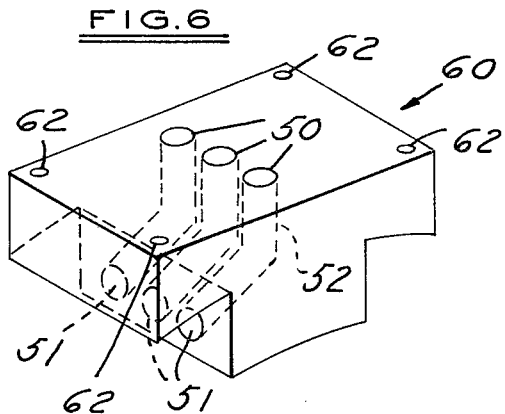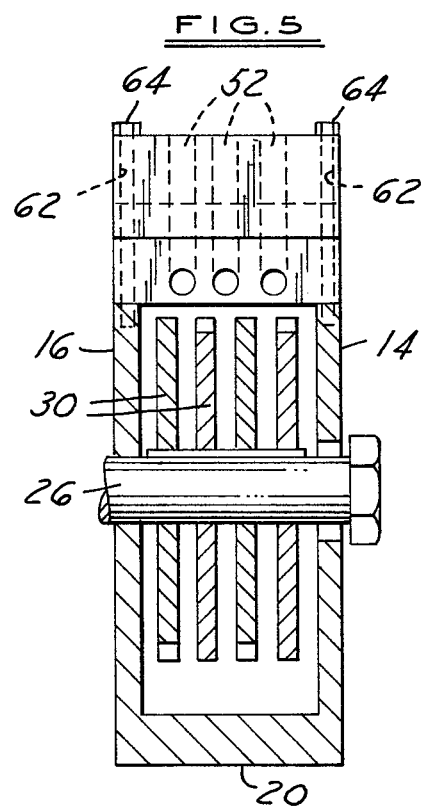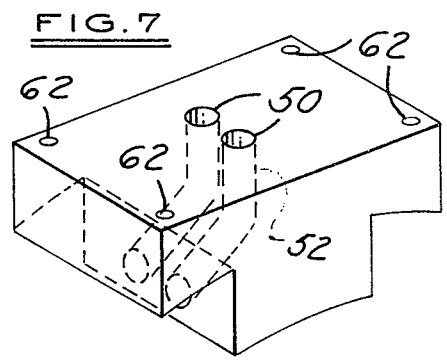

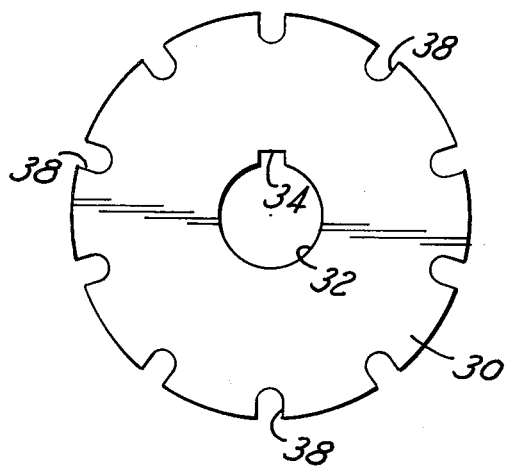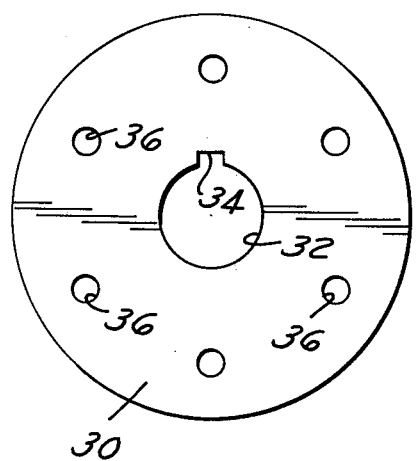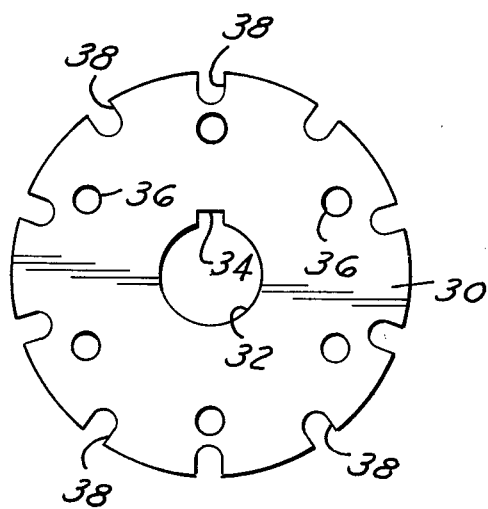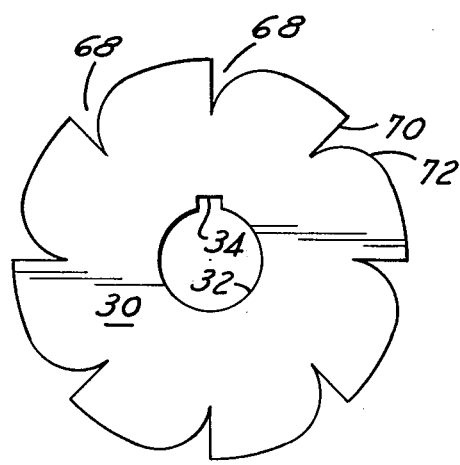

FLUID PROPULSION APPARATUS

CROSS REFERENCE TO RELATED APPLICATIONS

The invention disclosed and claimed herein contains subject matter common to my prior application for "Efficient Bladeless-Wheel Apparatus" filed Nov. 7, 1975, Ser. No. 629,894, and now abandoned.

BACKGROUND OF THE INVENTION

The principle of the rotating disc or "bladeless-wheel" pump or turbine is old and well-known with credit for its origin being generally attributed to Nikola Tesla. The U.S. Pat. No. to Tesla 1,061,142, sets forth the fundamentals of such a device which may be utilized either as a pump, to convert mechanical energy into fluid flow and thus pressure, or as a turbine, to convert fluid flow into mechanical energy. The efficiency of turbine engines utilizing this concept is, of course, well-accepted in the art.

Throughout the years many improvements have been made with respect to fluid propulsion apparatus as seen, for example, in the many patents and literature referred to in the Specification of my prior application, all the improvements being an attempt to approach the theoretical efficiency of a fluid propulsion apparatus of this type, i.e., there have been many attempts to achieve the theoretically possible maximum conversion of energy from one form to the other. With respect to pumps, the effort has been directed to achieving the desired pressure of the output fluid stream and in turbines the attempt has been to provide the maximum torque per revolution of the rotating discs.

None of the various improvements have made a significant inroad on the actual efficiency over the original Tesla model. In other words the prior art devices have not been able to achieve or even realistically approach the theoretical efficiency of a fluid propulsion apparatus.

Thus the present invention overcomes the aforementioned disadvantage by providing an improved fluid propulsion apparatus which more nearly approaches the theoretically possible efficiency of this type of device.

SUMMARY OF THE INVENTION

The present invention provides a new approach to the achievement of theoretically possible efficiency in a disc-like fluid propulsion apparatus.

According to the principles of the present invention, when the fluid propulsion apparatus is utilized as a pump, pitot-like flow paths at the outlet port bear a defined relationship to the cross-sectional area of the region between the periphery of the discs and the interior of the housing. Similarly, when the apparatus is utilized as a turbine, these pitot-like flow paths function as inlet nozzles for increased efficiency.

Specifically, the relationship is one of relative cross-sectional areas. In a fluid propulsion apparatus utilized as a pump, wherein a peripheral region is defined as that region between the interior of the apparatus housing and the periphery of the rotating discs, and wherein one or more pitot-like flow paths are provided as the outlet means, these pitot-like paths extend into the peripheral zone to vent and scoop up the fluid and, the cross-sectional area of the orifices of these pitot-like flow paths is equal to or less than about 60 percent of the "corresponding" cross-sectional area of the peripheral zone. The "corresponding" cross-sectional area is defined as the area within the peripheral zone having a length corresponding to the interior of the housing and a width corresponding to the diameter of the pitot-like flow path orifice.

Where the apparatus is utilized as a turbine, the same cross-sectional area relationship is maintained and, of course, the pitot-like flow paths are the inlet nozzles.

For use as a pump, multiple pitot-like flow paths, whose total cross-sectional area does not exceed the aforementioned 60 percent, provide an amplification or increase in the outlet pressure.

By maintaining this maximum cross-sectional area relationship, there are certain advantages to both the pump operation and the turbine operation. Specifically, with respect to pump operation, I have discovered that if the pitot flow path cross-sectional area exceeds 60 percent then there is a significant pressure drop and a reduced efficiency. Similarly, in turbine operation, if the cross-sectional inlet area exceeds 60 percent, this provides a limiting factor to the pressure or velocity of the inlet stream as it enters the peripheral zone.

Furthermore, according to the principles of the present invention, the pitot flow path arrangement is provided with a removable block secured to the housing. The block may be removed and a different block having a different pitot flow path arrangement and hence different pressure and flow characteristics may be substituted in its place. Thus the present invention includes the advantage of interchangeable pitot-like flow path arrangements.

To my knowledge I am the first inventor who has determined that the inlet and/or outlet area-to-peripheral zone relationship is a factor which limits the ability of a fluid propulsion apparatus from approaching the theoretical efficiency.

BRIEF DESCRIPTION OF THE DRAWINGS

The above identified advantages, together with other objects and advantages which may be attained by the use of the present invention, will become more apparent upon reading the following detailed description of the invention taken in conjunction with the drawings.

In the drawings, wherein like reference numerals identify corresponding parts:

FIG. 1 is a partly cut-away perspective illustration of a fluid propulsion apparatus according to the principles of the present invention;

FIG. 2 is a sectional view of an apparatus according to the principles of the present invention;

FIG. 3 is a perspective diagrammatic illustration of the principles of the present invention showing the cross-sectional area relationship between the pitot-like flow paths and the peripheral zone between the housing and the periphery of the discs;

FIG. 4 is a side elevation view, partly in section, of a fluid propulsion apparatus utilizing the pitot block of the present invention;

FIG. 5 is a side elevation view of the apparatus of FIG. 4, also in section;

FIG. 6 is a perspective illustration of the pitot block of the present invention;

FIG. 7 is a perspective illustration of another embodiment of the pitot block of the present invention; and FIGS. 8 through 11 illustrate different types of discs utilized according to the principles of the present invention.

DETAILED DESCRIPTION OF THE INVENTION

FIG. 1 illustrates generally a fluid propulsion apparatus 10 according to the principles of the present invention. The apparatus includes a generally disc-like hollow housing 12 including generally circular front and rear faces 14 and 16, respectively, interconnected by a peripheral edge 20. Each of the front and rear faces 14 and 16 has a central aperture 22, 24 extending therethrough and a shaft 26 extends through the hollow housing 12 and through the apertures in the front and rear faces.

The shaft 26 is generally circular in cross-section and has an upwardly extending key 27 along its length. As illustrated generally in FIG. 2, the shaft is secured by a bolt 28 on one side of the housing.

The apparatus further includes a plurality of rotatable discs 30 mounted on the shaft for rotation therewith and in FIG. 1 three such discs are illustrated. Each disc has a central aperture 32 with a keyway 34 to receive the key 27 of the shaft. Preferably the rotatable discs are relatively thin closely spaced parallel members of essentially the same diameter and thickness.

As illustrated generally in FIG. 1, each of the discs 30 has a series of apertures 36 extending therethrough, midway between the disc center and the disc peripheral edge. In addition, each of the discs has a series of peripheral grooves or notches 38.

The housing includes a first fluid port such as an inlet means 40 and a second fluid port such as the outlet means 42 such that fluid may be introduced into and removed from the apparatus. As may be expected with devices of this type, the housing should be suitably sealed with respect to the fluid port means and with respect to the rotatable shaft to prevent leakage. A peripheral zone 44 is defined as the region between the interior of the housing 12 and the peripheral edges of the discs.

If the apparatus 10 is to be utilized as a pump, means, not shown, are provided for rotating the shaft 26. The fluid in such an instance would be introduced at the port 40 surrounding the shaft such as by an inducer, not shown. This, of course, is conventional. Upon rotating the shaft 26, when the apparatus is utilized as a pump, the fluid (which may be steam, water, or even a slurry) follows a spiral path of increasing radius outwardly from the center of the apparatus and into the peripheral zone and then exits through the port means 42.

Conversely, if the apparatus is to be utilized as a turbine, then the fluid is introduced through the port means 42 to rotate the discs and thereby rotate the shaft 26. In such an instance the fluid would follow an inward spiral path toward the center of the apparatus and exit through the port means 40.

In FIG. 1 the apparatus is illustrated as including three rotatable discs 30 while in FIG. 2 a different embodiment is illustrated as including four rotatable discs. It may be appreciated that the size and number of discs are to be based upon the particular power requirements and thus the two embodiments are for illustrative purposes only. Similarly, the presence or absence of peripheral slots and central apertures are also optional. The principles of operation of a fluid propulsion apparatus of this type including the fluid boundary layer adherence and the like are, of course, well-known. Furthermore, the use of the central apertures to relieve or at least minimize pressure effects in the individual discs to avoid warping and buckling and non-parallel alignment problems caused by rapid disc rotation and by the passage of the fluid in its spiral path, is, of course, also well-known in apparatus of this type.

According to the principles of the present invention, improved means are provided, with respect to the utilization of the present apparatus as a pump, for the discharge of the spiraling fluid from the apparatus. In FIG. 1, two pitot-like tubes 50 are illustrated while in FIG. 2, three such tubes are illustrated. Each pitot-like tube 50 is actually a fluid flow path to provide a change in direction for the spiraling fluid. Thus in the embodiment of FIG. 1, if the shaft and discs are rotating clockwise, the spiraling fluid follows a clockwise outwardly spiraling path as well. The fluid enters the path of the pitot-like tube in a generally horizontal direction and then undergoes a roughly 90 degree change of direction exits in a vertical direction. For this reason, the pitot-like tubes 50 include a horizontal portion 51 and a vertical portion 52 interconnected by an elbow or curved portion 53.

One of the important features of the present invention is the discovery of an important physical relationship between the pitot-like tubes and the peripheral zone.

Specifically, and as illustrated in FIG. 3 in diagrammatic form, there is an important relationship between the total cross-sectional area of the openings of the pitot-like flow paths or tubes and the corresponding cross-sectional area of the peripheral zone. This "corresponding" cross-sectional area of the peripheral zone is defined as a strip having a length corresponding to the interior dimension of the housing parallel to the shaft and a height corresponding to the interior diameter of the pitot-like tubes. The specific relationship which I have discovered is that the total cross-sectional area of the pitot-like tube openings, for all of the pitot tubes in a particular apparatus, should not exceed about 60 percent of the corresponding cross-sectional area of the strip within the housing. Thus in FIG. 3, the height of the strip within the peripheral zone is illustrated between the arrows 55 as being equal to the orifice diameter of the pitot-like tubes.

The pitot-like tubes provide a collecting or scooping means for the fluid as it passes from the rotating tips of the discs into the peripheral zone 44. I have discovered that this is the important limiting factor which has precluded prior art apparatus of this type from approaching the expected theoretical efficiency. Namely, I have discovered that if the pitot tube opening is too large, relative to the corresponding cross-sectional area of the peripheral zone, then too much fluid would be vented or scooped or removed from the apparatus causing a pressure decrease and a loss of efficiency. As is well-known in a fluid propulsion apparatus of this type, when the apparatus is being utilized as a pump, the important feature is the pressure head of the fluid as it leaves the apparatus.

If the apparatus is being utilized as a turbine, then the pitot-like tubes are utilized for the inlet of the fluid. Again, the same relationship between the total area of the orifice of the pitot-like inlet tubes, relative to the cross-sectional area of the peripheral zone, should be maintained. Any greater proportion of pitot-like tube opening creates a loss of efficiency because of a fluid backup within the housing which is reflected as a back pressure to inhibit the introduction of additional fluid for continuous operation of the apparatus. Any lower proportion reduces the turbine output torque.

With reference to FIGS. 4 through 7, another important feature of the present invention will be explained. As may be recognized first by comparison of FIG. 1 with FIG. 2, different applications of the present invention require different pressure and flow characteristics and hence a different pitot-like tube outlet. The apparatus of FIGS. 4 through 7 overcomes the problem of prior art devices by providing a pitot block 60 which is removably secured to the housing 12. The pitot block 60 has a generally T-shaped cross-section and is generally rectangular in a plan view. The block has a plurality of apertures 62 extending therethrough so that bolts 64 may be utilized to secure the pitot-block 60 to the housing 12. The housing, of course, must be suitably modified from the housing of FIGS. 1 and 2 by removal of a portion of the edge 20 to accommodate the block 60. In addition, a gasket 66 must be provided to prevent leakage of fluid from the apparatus.

The block 60 includes pitot means or pitot flow paths which are utilized whether the apparatus functions as a pump or as a turbine. The pitot means, when utilizing a block 60 includes one or more fluid flow paths which are machined or bored through the block. The fluid flow means again includes a vertical section extending downwardly through the block, as at 52, a generally horizontal section 51 extending into the peripheral zone and a curved portion 53 therebetween to provide a continuous fluid flow path through the pitot block. Again, the cross-sectional area relationship is selected so as not to exceed the 60 percent of the corresponding peripheral zone as heretofore explained.

As illustrated in FIGS. 5 and 6, the pitot block 60 may include three pitot fluid flow paths 50 or, as illustrated in FIG. 7, the block may include only two such fluid flow paths 50.

From the foregoing, it is apparent that, depending on the type of pressure desired and particular application of the present apparatus, the pitot block may have any desired number of pitot flow paths therethrough and furthermore the blocks are interchangeable with respect to the housing so that a single apparatus may accommodate different pressure and flow characteristics for different applications. The pitot fluid flow path through the block perform the same function as the pitot tubes of FIGS. 1 and 2. Namely, if the apparatus is utilized as a pump, the flow path through the block serve to scoop or vent the outwardly spiraling fluid from the peripheral zone and outwardly of the apparatus whereas when the apparatus is utilized as a turbine, the pitot flow paths through the block provide the inlet into the peripheral zone for the fluid.

The feature of limiting the pitot cross-sectional area to a maximum of about 60 percent of the corresponding peripheral zone provides the greatest possible outlet pressure or head for the discharge stream (or alternatively the greatest possible inlet flow pressure in turbine operation).

While a single pitot flow path may be utilized, it is generally more advantageous to have a plurality of such flow paths in the apparatus. In other words, it is preferable, although not required, that a plurality of aligned pitot flow paths be provided, spaced apart across the width of the peripheral zone.

In a preferred embodiment where the discs 30 have a diameter in the range of 8 to 16 inches and the height of the peripheral zone is in the range of about one-half inch from the periphery of the disc to the interior of the housing, each pitot flow path should have a diameter of approximately one-quarter inch.

To give an operating illustration of the advantage of the present invention, a conventional apparatus with disc configurations of an 8 inch diameter was operated by a 7.5 horsepower motor at 3500 rpm to pump water through the apparatus. The apparatus delivered about 180 gallons per minute at an 80 foot pressure head, i.e., about 20 pounds per square inch.

With reference now to FIGS. 8 through 11, variations of the discs 30 are illustrated. In FIG. 8, the disc 30 only has a plurality of peripheral U-shaped slots 38.

FIG. 9 illustrates a disc 30 having only a plurality of central apertures or holes 36 extending there through.

FIG. 10 illustrates a disc 30 having both apertures and discs corresponding generally to the discs of FIG. 1.

FIG. 11 illustrates a disc having notches 68 around the periphery thereof with the notches having one side or edge generally straight as a radius 70 of the disc, and the other edge tapered upwardly from the bottom of the notch as at 72. This provides a relief function and may thus be utilized more advantageously for turbine operation.

Expanding upon this idea further, it may be understood with respect to the apparatus of FIG. 4 that when the apparatus is operated as a turbine, the angular orientation of the pitot flow path is such that the fluid enters in a counter-clockwise stream thus providing counter-clockwise rotation of the disc 30 and the output shaft 26. By removing the disc of FIG. 4 and using the disc of FIG. 11, the curved edge 72 of each notch offers more ease of entry of the fluid into the notch and the straight edge 70 of the notch resists the exiting of the fluid from the notch thus providing a more efficient operation. The Tesla boundary layer principle further protects the discs from erosion during operation as a turbine.

Many changes may be made from the present invention without departing from the spirit and scope thereof. The invention has been described in a preferred embodiment for the purpose of illustration and not by way of limitation. The invention, therefore, should be limited only by the scope of the following claims.

What is claimed is:

1. In a fluid propulsion apparatus including a generally circular hollow housing having opposed side walls, a shaft rotatably mounted in said housing, a plurality of spaced apart circular discs mounted on the shaft for rotation therewith, interiorly of said housing, said discs being concentric relative to said housing, a circumferential peripheral zone defined as the region between the interior of the housing and the periphery of said discs, a first fluid port means and a second fluid port means, each of said fluid port means extending through said housing and in communication with the interior thereof so that a fluid stream entering one of said ports flows through said housing in a spiral path and exits from the other of said ports, the improvement comprising:

said first fluid port means including an elongated pitot-like flow path having a first end lying in and in communication with said peripheral zone, said flow path first end being essentially free of any taper and lying in a plane substantially normal to the flow path within said peripheral zone;

said flow path having a cross-sectional area at said first end not greater than about 60 percent of the cross-sectional area of a strip of the peripheral zone lying in said plane and bounded by the radial limits of said first end of said flow path and bounded axially by the opposed side walls of said housing.

2. The invention as defined in claim 1 wherein said first fluid port means is the exit port for said fluid stream so that said apparatus functions as a pump.

3. The invention as defined in claim 1 wherein said first fluid port means is the entrance port for said fluid stream so that said apparatus functions as a turbine.

4. The invention as defined in claim 1 wherein said discs have central apertures extending therethrough.

5. The invention as defined in claim 1 wherein said discs have peripheral slots.

6. The invention as defined in claim 1 wherein said first fluid port means includes a removable pitot block having a fluid flow path therethrough, said pitot block being of generally T-shape in cross-section having a base and a single leg depending therefrom, said first fluid port means extending through said base and said leg, said leg extending into said peripheral zone.

7. The invention as defined in claim 6 wherein said pitot block has a plurality of pitot-like fluid flow paths extending therethrough into said peripheral zone.

8. In a fluid propulsion apparatus including a generally circular hollow housing having opposed side walls, a shaft rotatably mounted in said housing, a plurality of spaced apart circular discs mounted on the shaft for rotation therewith, interiorly of said housing, said discs being concentric relative to said housing, a circumferential peripheral zone defined as the region between the interior of the housing and the periphery of said discs, a first fluid port means and a second fluid port means, each of said fluid port means extending through said housing and in communication with the interior thereof so that a fluid stream entering one of said ports flows through said housing in a spiral path and exits from the other of said ports, the improvement comprising:
said first fluid port means including a removable pitot block secured to said housing and having at least one pitot-like flow path extending therethrough, said pitot block being of generally T-shape in cross-section having a base and a single leg depending therefrom, said first fluid port means extending through said base and said leg, said leg extending into said peripheral zone,
said first fluid port means having a first end being essentially free of any taper and lying in a plane substantially normal to said flow path.

9. In a method of fluid propulsion including providing a generally circular hollow housing having opposed side walls, a shaft rotatably mounted in said housing, a plurality of spaced apart circular discs mounted on the shaft for rotation therewith interiorly of said housing, said discs being concentric relative to said housing, a peripheral zone defined as the region between the interior of the housing and the periphery of said discs, a first fluid port means and a second fluid port means, each of said fluid port means extending through said housing and in communication with the interior thereof so that a fluid stream entering one of said ports flows through said housing in a spiral path and exits from the other of said ports, said first fluid port means including an elongated pitot-like flow path having a first end lying in and in communication with said peripheral zone, said flow path first end being essentially free of any taper and lying in a plane substantially normal to said flow path; the improved method of increasing the fluid propulsion efficiency comprising the steps of introducing a fluid stream into said housing through one of said fluid port means so that said fluid stream flows through said one fluid port means, said peripheral zone, and said flow path; and adjusting the cross-sectional area of said flow path to an area not greater than about sixty percent of the cross-sectional area of a portion of the peripheral zone lying in said plane and bounded by the radial limits of said first end of said flow path and bounded axially by the opposed side walls of said housing.

10. The invention as defined in claim 9 wherein said first fluid port means includes a first removable pitot block having said fluid flow path therethrough and;
wherein said step of adjusting the cross-sectional area of said flow path includes replacing said first removable pitot block with a second removable pitot block having a fluid flow path therethrough;
the fluid flow path of said second removable pitot block having a different cross-sectional area than the fluid flow path of said first removable pitot block.

* * * * *